United States Patent [19]

Kawai

[11] Patent Number: 5,235,661
[45] Date of Patent: Aug. 10, 1993

[54] OPTICAL CONNECTION DEVICE OF A PLANAR TYPE

[75] Inventor: Shigeru Kawai, Tokyo, Japan

[73] Assignee: NEC Corporation, Tokyo, Japan

[21] Appl. No.: 766,259

[22] Filed: Sep. 27, 1991

[30] Foreign Application Priority Data

Sep. 27, 1990 [JP] Japan ................................. 2-258450
Sep. 27, 1990 [JP] Japan ................................. 2-258451

[51] Int. Cl.$^5$ ............................................. G02B 6/26
[52] U.S. Cl. ........................................ 385/129; 385/48
[58] Field of Search ................ 385/129, 128, 130, 14, 385/48, 131

[56] References Cited

U.S. PATENT DOCUMENTS

| 3,491,245 | 1/1970 | Hardesty | 385/901 X |
| 4,053,206 | 10/1977 | Yevick | 385/901 X |
| 4,732,444 | 3/1988 | Papuchon et al. | 385/14 X |
| 4,750,799 | 6/1988 | Kawachi et al. | 385/14 |
| 4,761,047 | 8/1988 | Mori | 385/901 X |
| 4,765,701 | 8/1988 | Cheslak | 385/901 X |
| 4,984,863 | 1/1991 | Parriaux et al. | 385/14 X |

OTHER PUBLICATIONS

H. J. Haumann et al, "Optical Bus Based on Light--Guided-Plates", Conference Record of '90 International Topical Meeting on Optical Computing Japanese Unexamined Patent Publication Tokko Hei 2-34814 1990.

Oikawa et al, "Integrated Planar Microlens and its Applications", Proceedings of SPIE, vol. 898 1988.

Primary Examiner—John D. Lee
Assistant Examiner—Phan Thi Heartney
Attorney, Agent, or Firm—Sughrue, Mion, Zinn, Macpeak & Seas

[57] ABSTRACT

In an optical connection device for use in responding to an incident light beam to produce a plurality of output light beams, the incident light beam is incident onto a planar substrate on which a plurality of optical islands which have refraction coefficients different from the planar substrate. The incident light beam travels as an internal light beam within the planar substrate with reflections repeated in the planar substrate and is emitted as output light beams through the optical islands when the internal light beam arrives at the optical islands. Thus, the incident light beam is distributed through the optical islands outside of the planar substrate. If each of optical nodes is located in vicinity of the optical islands and generates the input light beam and receives each of the output light beams, bidirectional communication can be carried out through the planar substrate and the optical islands among the optical nodes.

13 Claims, 6 Drawing Sheets

OPTICAL CONNECTION DEVICE OF A PLANAR TYPE

BACKGROUND OF THE INVENTION

This invention relates to an optical connection device for use in optically connecting a plurality of optical nodes to one another and to an optical coupler used in the optical connection device.

In order to process a great deal of information, development is progressive or advanced in regard to a computer which is capable of executing calculation at a very high speed. In this event, it is known in the art that sequential processing which uses electric circuitry is about to approach a performance limit in processing speed. Taking this into consideration, a parallel processing architecture has been researched in a super computer or an array processor to concurrently execute calculations.

In the meanwhile, it is to be noted that a light beam is excellent for parallel processing because the light beam is spacially expanded and has a physical property in which no interference takes place one another. Accordingly, a recent interest is directed to parallel processing which uses the light beam or beams, rather than parallel processing using electric signals.

In order to accomplish such parallel processing by the use of the light beams, the light beams are inevitably optically coupled to or combined with one another. For this purpose, the light beams are often deflected by an optical deflector from the others. Such an optical deflector is formed by a hologram technique or a prism. However, it is difficult to precisely design or manufacture the optical deflector. Moreover, the optical deflector needs an intricate optical system to optically couple the optical deflector to another device or circuit.

In order to solve such a disadvantage, a proposal is made about a planar optical connection device by H. J. Haumann et al in Conference Record of '90 International Topical Meeting on Optical Computing under the title of "Optical Bus Based on Light-guided-plates". With this planar optical connection device, an optical beam or a light beam is distributed by a hologram. However, the planar optical connection device is disadvantageous in that only a small amount of light is utilized in the optical connection device and unnecessary diffraction light beams objectionably occur.

Alternatively, an optical beam distributor is disclosed in Japanese Unexamined Patent Publication Tokko Hei 2-34814, namely, 34814/1990, to optically and concurrently distribute a light beam emitted from a light source, to a plurality of light reception elements or optical receivers, such as phototransistors, which are electrically coupled to an integrated circuit formed on a planar substrate. Specifically, the optical beam distributor comprises a semi-spherical surface to which a plurality of lenses are located so that each lens can receive the light beam. The optical beam is distributed through the lenses as output light beams onto the light reception elements formed on the planar substrate. With this structure, it is possible to supply each of the light reception elements with the output light beams without deviation of optical axes and without aberration. Therefore, the optical beam distributor is effective to concurrently feed clock pulses from the light source to the respective light reception elements.

Thus, the optical beam distributor is available for transmitting a single light source to a plurality of light reception elements. However, consideration is made neither about transmitting a light beam through the planar substrate nor about bidirectional communication among optical terminals or nodes, such as light sources and reception elements.

BACKGROUND OF THE INVENTION

It is an object of this invention to provide an optical connection device which is capable of optically coupling a plurality of optical terminals or nodes through a planar substrate.

It is another object of this invention to provide an optical connection device of the type described, which enables bidirectional communication among the optical nodes.

It is still another object of this invention to provide an optical connection device of the type described, which is operable as an optical bus.

An optical connection device to which this invention is applicable is for use in responding to an input light beam to produce a plurality of output light beams therethrough. The optical connection device comprises a planar optical transmission medium which has a primary refraction coefficient and which has first and second principal surfaces opposite to each other and a side surface contiguous to the first and the second principal surfaces, a plurality of optical island regions which are formed from the first principal surface towards the second principal surface with spacings left among the optical island regions on the first principal surface and each of which has a secondary refraction coefficient different from the primary refraction coefficient, and optical source means for emitting the input light beam onto the side surface of the planar optical transmission medium to derive the output light beams from the optical island regions.

DESCRIPTION OF THE PREFERRED EMBODIMENTS

Principles of the Invention

Figure 1:
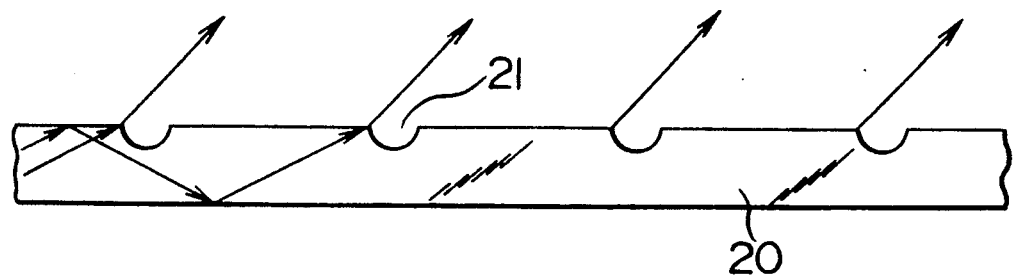
FIG. 1 is a schematic view for use in describing a first primary principle of this invention.
Figure 2:
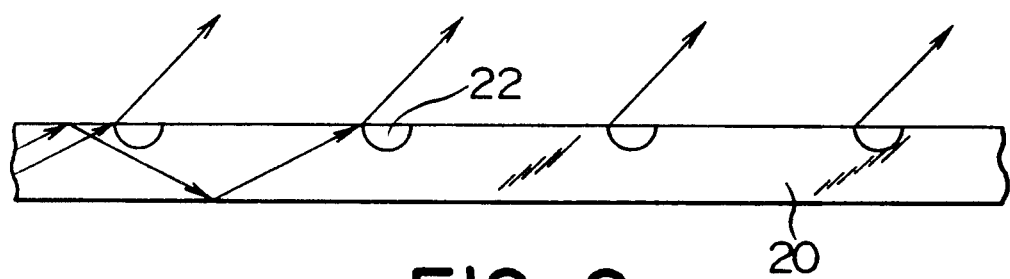
FIG. 2 is a similar view for use in describing a second primary principle of this invention.
Figure 3:
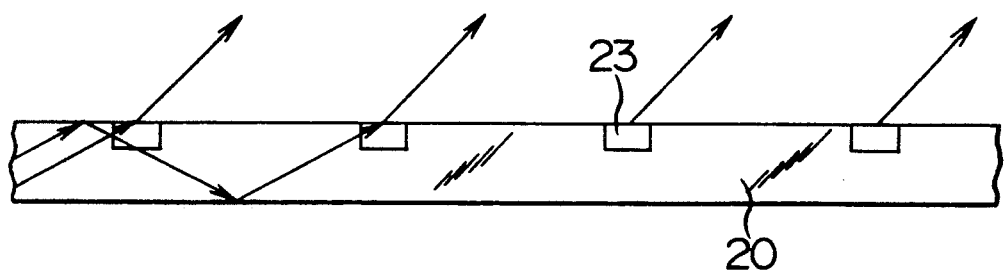
FIG. 3 is a similar view for use in describing a third primary principle of this invention.

Referring to FIGS. 1 through 3, description will be made as regards primary principles of this invention so as to facilitate a better understanding of this invention.

In FIG. 1, a planar substrate or plate 20 of glass is utilized to form an optical connection device according to this invention on the basis of a first one of the primary principles. The planar substrate 20 has a predetermined refraction coefficient, first and second principal surfaces directed upwards and downwards of FIG. 1, respectively, and a side surface contiguous to both the first and the second principal surfaces. On the first principal surface, a plurality of recessed portions or dimples 21 are formed towards the second principal surface. Each recessed portion 21 defines a concave semispherical surface which has predetermined curvature and which forms a boundary between an atmosphere and the planar substrate 20. As readily understood from FIG. 1, the predetermined curvature may be negative curvature.

Inasmuch as the predetermined refraction coefficient of the planar substrate 20 is greater than air, the semispherical surface serves as a lens.

Under the circumstances, it is assumed that an incident light beam is incident from the left side of FIG. 1 to the side surface of the planar substrate 20 at an angle which is greater than a critical angle of the planar substrate 20. The incident light beam travels as an internal light beam within the planar substrate 20. In this case, the internal light beam is subjected to total reflection between the first and the second principal surfaces and is confined within the planar substrate 20, while the internal light beam does not arrive at the recessed portions.

However, when the light beam arrives at the recessed portions, the light beam is emitted as output light beams from the recessed portions outside of the planar substrate 20 because each output angle of the light beam is smaller than the critical angle of the planar substrate 20. With this structure, the output light beams are sent through the respective recessed portions to any other devices.

In FIG. 2, a planar substrate 21 is similar to that illustrated in FIG. 1 and serves to manufacture an optical connection device on the basis of a second one of the primary principles. In addition, a plurality of low refraction regions 22 are formed from the first principal surface towards the second principal surface instead of the recessed portions 21. The low refraction regions have semispherical boundaries and refraction coefficients lower than the planar substrate 20 and can be formed by an ion exchange technique known in the art. Inasmuch as a critical angle of each low refraction region is greater than that of the planar substrate 20, the internal light beam is emitted as output light beams from the low refraction regions 22, while the internal light beam is subjected to total reflection except for the low refraction regions 22. At any rate, the output light beams appear through the first principal surface of the planar substrate 20.

In FIG. 3, description will be made about a third one of the primary principles wherein a plurality of hologram regions 23 are formed on the planar substrate 20 instead of the low refraction regions 22. With this structure, the internal light beam is diffracted by each of the hologram regions 23 to be emitted as output light beams outside of the planar substrate 20, although the internal light beam is subjected to total reflection except for the hologram regions 23. Such hologram regions 23 may be formed by an ion exchange technique.

Embodiments

Figure 4:
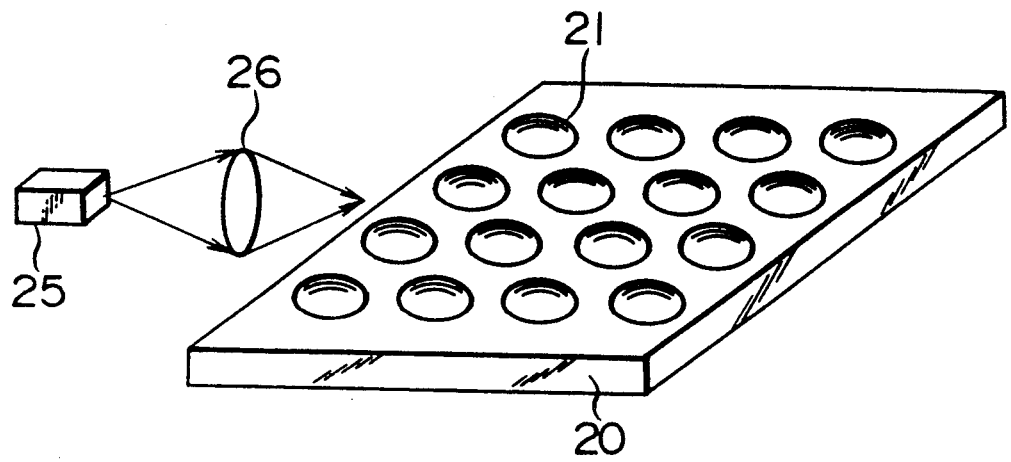
FIG. 4 is a perspective view of an optical connection device according to a first embodiment of this invention.

Referring to FIG. 4, an optical connection device according to a first embodiment of this invention is based on the first primary principle illustrated in FIG. 1 and comprises a planar substrate or plate 20 of glass which has first and second principal surfaces and a side surface, like in FIG. 1 and which serves as a planar optical transmission medium. In FIG. 4, the planar substrate 20 has a rectangular configuration and a predetermined refraction coefficient of, for example, 1.5. The predetermined refraction coefficient may be called a primary refraction coefficient. Sixteen (4 by 4) recessed or dimple portions 21 are formed or embedded from the first principal surface towards the second principal surface and have predetermined curvature, as mentioned in conjunction with FIG. 1. The recessed portions 21 provides a refraction coefficient which is different from the primary refraction coefficient and may be referred to as a secondary refraction coefficient. A combination of the planar substrate 20 and the recessed portions 21 will be called an optical coupler, as will become clear as the description proceeds. The optical coupler responds to an input optical beam to produce a plurality of output light beams.

In addition, the illustrated optical connection device comprises a light source 25, such as a laser, for generating the input light beam and an optical system 26 for guiding the input light beam as an incident light beam onto the side surface of the planar substrate 20. The optical lens system 26 may be composed of a wide variety of lenses, although a single convex lens alone is illustrated in FIG. 4. The optical input beam is optically collected by the optical lens system 26 to be produced as the incident light beam. Preferably, the incident light beam may have a width along the side surface of the planar substrate 20.

At any rate, the incident light beam is incident as an internal light beam through the optical lens system 26 from the light source 25 into the planar substrate 20 at an angle greater than the critical angle of the planar substrate 20. In this case, the internal light beam is subjected to total reflection between the first and the second principal surfaces and is confined within the planar substrate 20, as long as the internal light beam does not reach the recessed portions 21.

When the internal light beam reaches the recessed portions 21 having the predetermined curvature, an output angle of the incident light beam becomes smaller than the critical angle at each recessed portion 21. As a result, the internal light beam is emitted from each recessed portion 21 as an output light beam. In the example being illustrated, sixteen output light beams are emitted from the respective recessed portions 21 to be sent to any other devices. Thus, the optical connection device is operable to optically connect the light source 25 to the other devices which may be equal in number to sixteen. In other words, the illustrated device serves to distribute the input light beam to the other devices and may be therefore called an optical distributor or an optical coupler.

With this structure, it is possible to determine the number of devices to be optically connected to the optical connection device in dependency upon the number of the recessed portions which are two-dimensionally arranged on the planar substrate 20.

Figure 5:
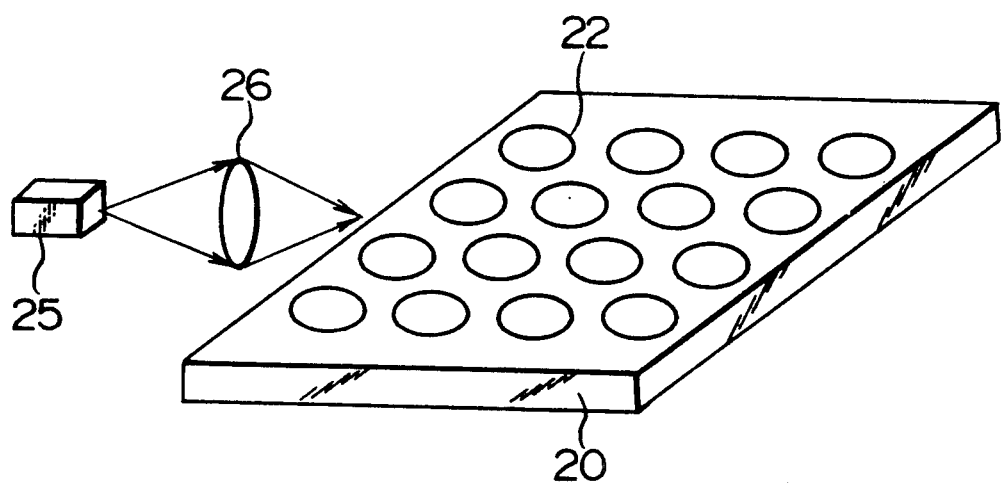
FIG. 5 is a similar view of an optical connection device according to a second embodiment of this invention.

Referring to FIG. 5, an optical connection device according to a second embodiment of this invention is based on the second primary principle illustrated in conjunction with FIG. 2 and is similar in structure to that illustrated in FIG. 4 except that sixteen low refraction regions 22 are arranged on the planar substrate 20 in lieu of the recessed portions 21. Each of the low refraction regions 22 may be formed by the use of an ion exchange technique known in the art and may have a refraction coefficient of, for example, 1.4. The refraction coefficient of each low refraction region 22 may be called a secondary refraction coefficient while the refraction coefficient of the planar substrate 20 may be called a primary refraction coefficient. In any event, a combination of the planar substrate 20 and the low refraction regions constitutes an optical coupler. Like in FIG. 4, an input light beam is generated by a light source 25 and is incident as an incident light beam through an optical lens system 26 to the side surface of the planar substrate 20.

Inasmuch as critical angles become large at the low refraction regions 22 in comparison with that of the planar substrate 20, as mentioned with reference to FIG. 2, the internal light beam is emitted from the low refraction regions 22 outside of the planar substrate 20, although the internal light beam is subjected to total reflection except for the low refraction regions 22. As a result, the internal light beam is emitted and distributed to any other devices as output light beams like in FIG. 4.

Figure 6:
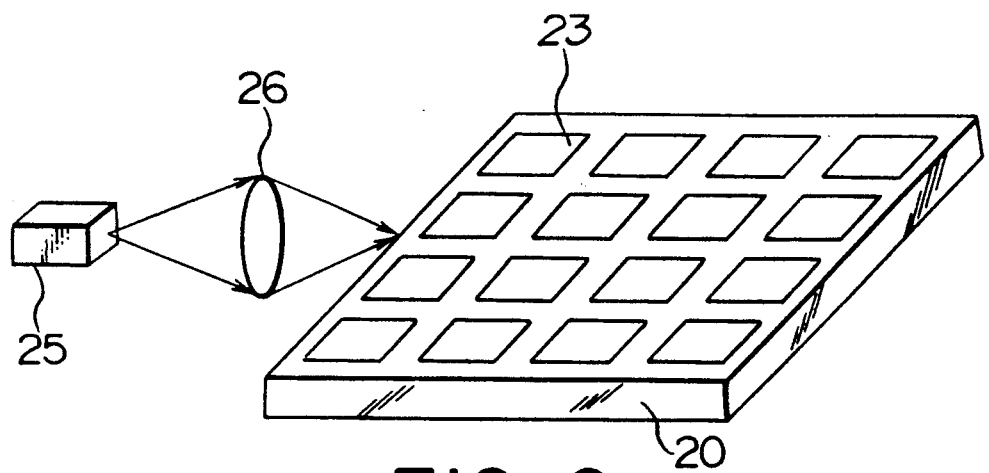
FIG. 6 is a similar view of an optical connection device according to a third embodiment of this invention.

Referring to FIG. 6, an optical connection device according to a third embodiment of this invention is based on the third primary principle illustrated in conjunction with FIG. 3 and is similar in structure and operation to that illustrated in FIGS. 4 and 5 except that sixteen hologram regions 23 are substituted for the recessed portions 21 or the low refraction regions 22. The illustrated hologram regions 23 have square configurations. Thus, the planar substrate 20 and the hologram regions 23 provide an optical coupler. As known in the art, such hologram regions 23 can be produced by the use of an ion exchange technique. In this event, each hologram region 23 is formed by a material which is different from the planar substrate 20 and which has a refraction coefficient different from the planar substrate 20. Such a material may be, for example, $SiO_2$ locally exchanged to $LiO_2$. Such materials are reported by Oikawa et al in Proceeding of SPIE Vol. 898 under the title of "Integrated Planar Microlens and its Applications".

As are the cases with FIGS. 4 and 5, the input light beam is generated by the light source 25 and to incident as the incident light beam onto the side surface of the planar substrate 20 through the optical lens system 26 to be introduced into the planar substrate 20 as an internal light beam. As a result, the internal light beam is subjected to total reflection between the first and the second principal surfaces of the planar substrate 20 and confirmed within the planar substrate 20 except for the hologram regions 23.

On the other hand, the internal light beam is diffracted by the hologram regions 23 and emitted as the output light beams from the hologram regions 23 to be distributed to any other devices, like in FIGS. 4 and 5. In FIGS. 4 through 6, the recessed portions 21, the low refraction regions 22, and the hologram regions 23 may be collectively called island regions.

Principles

Figure 7:
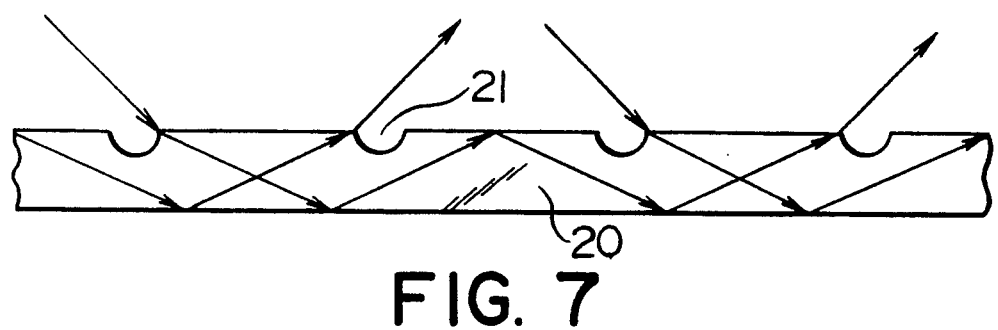
FIG. 7 is a schematic view for use in describing a first additional principle of this invention.
Figure 8:
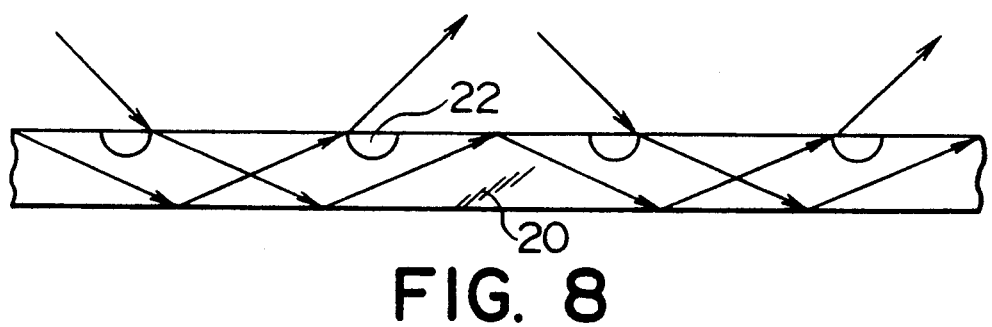
FIG. 8 is a similar view for use in describing a second additional principle of this invention.
Figure 9:
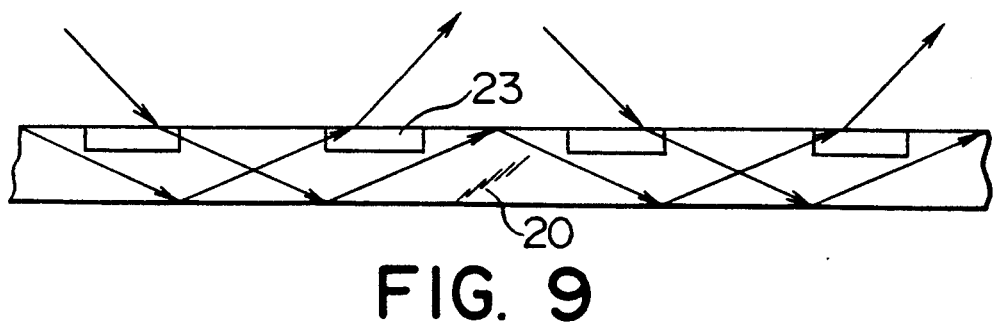
FIG. 9 is a similar view for use in describing a third additional principle of this invention.

Referring to FIGS. 7 through 9, description will be made about additional principles of an optical connection device according to this invention. The illustrated optical connection device serves as an optical bus which carries out bidirectional communication. Like in FIGS. 1 through 3, planar substrates 20 of glass are used to transmit internal light beams in FIGS. 7 through 9, respectively. However, it is to be noted that an input light beam is incident as an incident light beam onto the first principal surface of each planar substrate 20 or onto island regions in FIGS. 7 through 9.

In FIG. 7, description will be made about a first one of the additional principles wherein a plurality of recessed portions 21 are formed from the first principal surface of the planar substrate 20 towards the second principal surface, like in FIG. 1. The recessed portions 21 have predetermined negative curvature, as mentioned in conjunction with FIG. 1, and are therefore concave relative to the first principal surface. In this event, it is assumed that the illustrated planar substrate 20 is located in an atmosphere and that the incident light beam is incident through the first principal surface as an internal light beam into the planar substrate 20. In addition, it is also assumed that the internal light beam arrives on the first and the second principal surfaces at an angle greater than a critical angle of the planar substrate 20. As a result, the internal light beam is subjected to total reflection by both the first and the second principal surfaces and travels between the first and the second principal surfaces. Thus, the internal light beam is confined within the planar substrate 20 as long as the internal light beam is not incident onto the recessed portions 21. However, when the internal light beam arrives on the recessed portions 21, the internal light beam is emitted through the recessed portions 21 as output light beams because an output angle of the internal light beam becomes smaller than the critical angle of the planar substrate 21 at each of the recessed portions.

Alternatively, the first and the second principal surfaces may be coated with reflection films (not shown in this figure). In this case, the internal light beam may not be incident onto each of the first and the second principal surfaces at an angle smaller than the critical angle of the planar substrate 20.

At any rate, the bidirectional communication can be carried out if an optical terminal or node is adjacent to each recessed portion so as to transmit each incident light beam into the planar substrate 20 and to receive each output light beam into the planar substrate 20. From this fact, it is readily understood that the planar substrate 20 serves as an optical bus which enables bidirectional communication among the optical terminals or nodes.

In FIG. 8, a second one of the additional principles will be described wherein a plurality of low refraction regions 22 are formed along the first principal surface of the illustrated planar substrate 20, like in FIG. 2. Such low refraction regions 22 may be formed by the use of an ion exchange technique, as mentioned with reference to FIG. 2 and have critical angles greater than that of the planar substrate. The low refraction regions 22 is operable in a manner similar to concave lenses.

In this case, incident light beams are incident into the planar substrate 20 through the first principal surface and the low refraction regions 22 as internal light beams. If incident angles of the internal light beams within the planar substrate 20 are greater than the critical angle of the planar substrate 20, the internal light beams are subjected to total reflection on the first and the second principal surfaces and confined within the planar substrate 20. On the other hand, when the internal light beams arrive at the low refraction regions 22, the internal light beams are emitted as output light beams through the low refraction regions 22.

When optical nodes are located in vicinity of the low refraction regions to emit the incident light beams and to receive the output light beams, bidirectional communication can be carried out among the optical nodes through the planar substrate 20 and the low refraction regions 22.

If reflection layers are coated on the first and the second principal surfaces of the planar substrate 20, the internal light beams may not be subjected to total reflection on the first and the second principal surfaces.

In FIG. 9, a plurality of hologram regions 23 are formed to manufacture an optical connection device on the basis of a third one of the additional principles by the use of an ion exchange technique. As illustrated in FIG. 9, the hologram regions 23 are formed along the first principal surface of the illustrated planar substrate 20 by the use of an ion exchange technique, as mentioned in conjunction with FIG. 3 and have a secondary refraction coefficient which is different from the primary refraction coefficient to diffract an internal light beam into each output light beam. Incident light beams are incident through the first principal surface and the hologram regions 23 into the planar substrate 20 as the internal light beams. In this event, the incident light beams are incident onto the first principal surface so that the internal light beams arrive within the planar substrate 20 on the first and the second principal surfaces at an angle greater than the critical angle of the planar substrate 20.

When the internal light beams arrive at the hologram regions 23, the internal light beams are diffracted by the hologram regions 23 in a known manner to be emitted from the hologram regions 23 as output light beams, like in FIGS. 7 and 8. From this fact, it is apparent that bidirectional communication can be carried out among optical nodes adjacent to the hologram regions 23 and the above-mentioned structure serves as an optical bus, like FIGS. 7 and 8.

Figure 10:
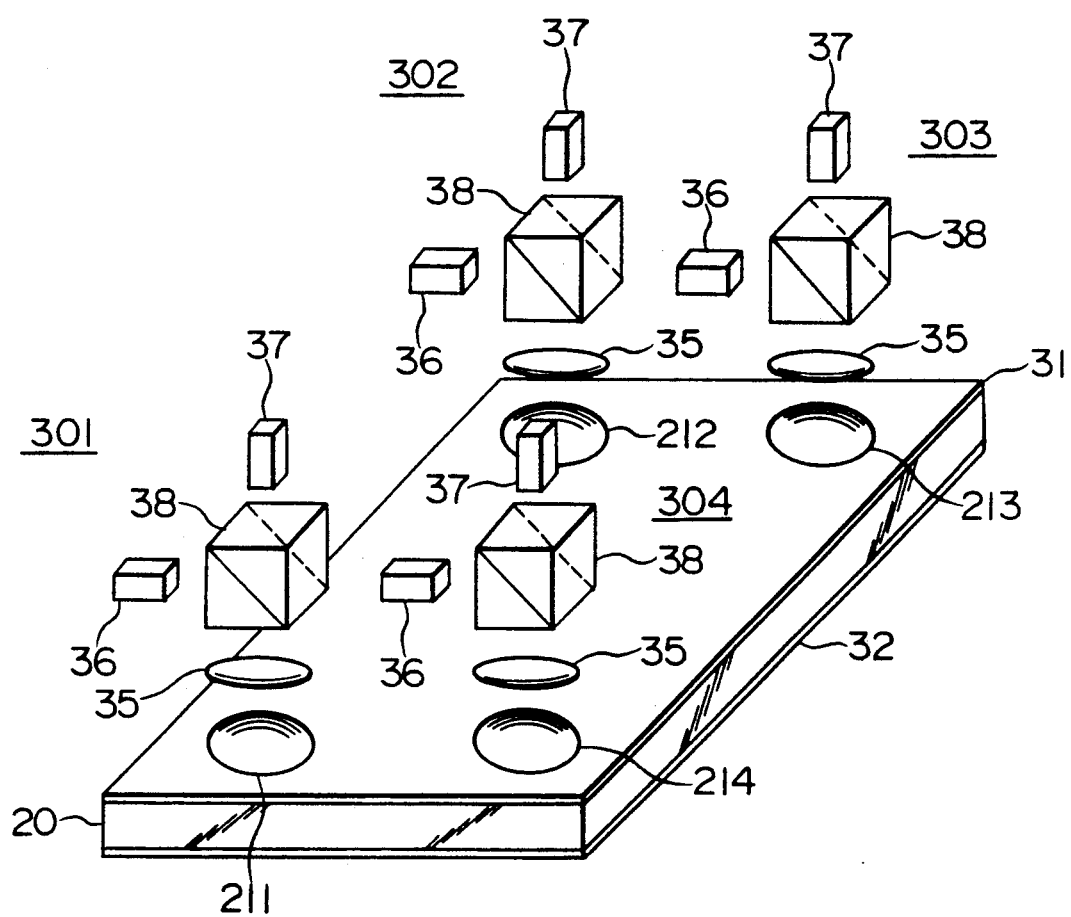
FIG. 10 is a perspective view of an optical connection device according to a fourth embodiment of this invention based on the first additional principle illustrated in FIG. 7.

Referring to FIG. 10, an optical connection device according to a fourth embodiment of this invention is based on the first additional principal and enables bidirectional communication among first through fourth optical nodes or terminals 301, 302, 303, and 304 each of which is similar in structure and operation to one another. In this connection, description will be mainly made as regards the first optical node 301 as a representative of the first through the fourth optical nodes 301 through 304.

Now, the illustrated optical connection device is optically coupled to an optical coupler as will be mentioned hereinunder. The optical coupler comprises a planar substrate 20 which is similar to that illustrated in FIG. 7 and which has first and second principal surfaces directed upwards and downwards of FIG. 10, respectively. The first and the second principal surfaces are coated with first and second reflection films 31 and 32. Along the first principal surface, first through fourth recessed portion 211 to 214 are formed through the first reflection film 31 to provide concave lenses, as mentioned in conjunction with FIG. 7 and are operable as optical islands.

The first through the fourth optical nodes 211 to 214 are located in vicinity of the first through the fourth recessed portions 211 to 214 so as to be optically coupled to the first through the fourth recessed portions 211 to 214. Each of the first through the fourth optical terminals or nodes 301 to 304 comprises an optical lens system 35 which is specified by a single convex lens and which is faced to each recessed portion 211 to 214, a light source 36, such as a laser, for generating an input light beam in a horizontal direction of FIG. 10, and an optical receiver 37, such as a phototransistor, for receiving the output light beam sent through each of the recessed portions 211 to 214. Between the light source 36 and the optical receiver 37, a beam splitter 38 is positioned to supply the input light beam and the output light beam to each of the recessed portions 211 to 214 and to each optical receiver 37, respectively. This shows that the beam splitter 38 serves to separate the input and the output light beams from each other and may be implemented, for example, by a polarizing beam splitter known in the art.

In any event, a combination of the optical lens system 35 and the beam splitter 38 may be referred to as an optical system for transmitting the output light beam to the optical receiver 37 on one hand and for transmitting the input light beam to each recessed portion. In this case, the input and the output light beams may be collectively called an optical transmission beam.

Specifically, let the input light beam be emitted from the light source 36 of the first optical node 301 to the first recessed portion or optical island 211 through the beam splitter 38 and the optical lens system 35 as an incident light beam. The incident light beam is introduced through the first recessed portion 211 into the planar substrate 20 as the internal light beam. The internal light beam is bounded or reflected between the first and the second reflection films 31 and 32 and is confined within the planar substrate 20. During the reflection, the internal light beam arrives at the second through the fourth recessed portions 212 to 214 to be emitted from them as the output light beams. Each of the output light beams is transmitted through the optical receiver 37 at each of the second through the fourth optical nodes 212 to 214 when the internal light beam arrives at each recessed portion at an angle smaller than the critical angle of the planar substrate 20. Thus, the input light beam is transmitted from the first optical node 301 to the remaining optical nodes through the planar substrate 20 and the recessed portions.

Similar operation is carried out at the remaining optical nodes. Therefore, the illustrated optical connection device enables the bidirection communication among the first through the fourth optical nodes and serves as the optical bus.

In the example being illustrated, it is assumed that each incident light beam is incident through each recessed portion into the planar substrate. However, if the incident light beam is incident through the first principal surface at an angle greater than the critical angle of the planar substrate 20 as an internal light beam and the internal light beam is subjected to total reflection within the planar substrate 20, the first and the second reflection films 31 and 32 may not be coated on the first and the second principal surfaces.

Figure 11:
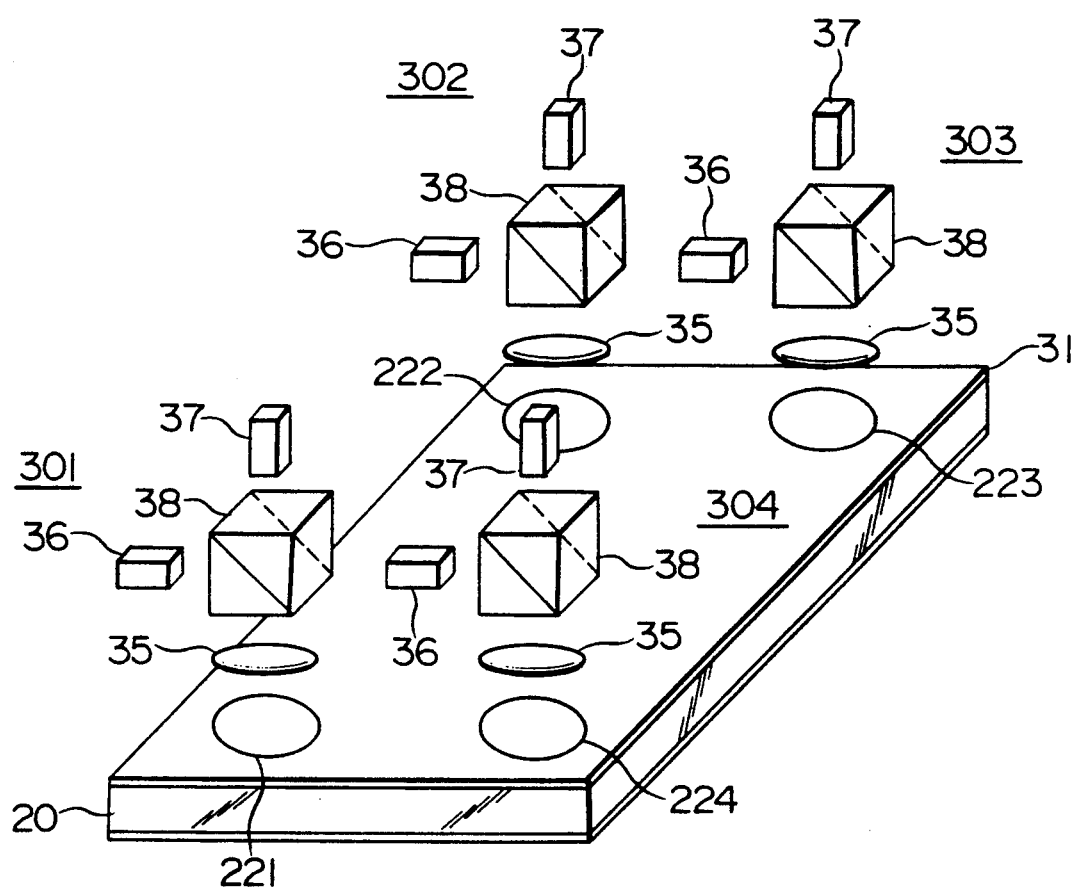
FIG. 11 is a similar view of an optical connection device according to a fifth embodiment of this invention based on the second additional principle illustrated in FIG. 8.

Referring to FIG. 11, an optical connection device according to a fifth embodiment of this invention is based on the second additional principle and is similar in structure and operation to that illustrated in FIG. 10 except that first through fourth low refraction regions 221 to 224 are substituted for the first through the fourth recessed portions 211 to 214 to form optical islands. Each of the first through the fourth low refraction regions 221 to 224 has a circular shape and a refraction coefficient smaller than that of the planar substrate 20, as mentioned in FIG. 8. With this structure, it is possible to optically couple the first through the fourth optical nodes 301 to 304 to one another in a manner similar to that illustrated in FIG. 10 and to form the optical bus.

In the illustrated example, it is assumed that the incident light beam is incident through each low refraction region into the planar substrate 20 and that the output light beam is emitted through each of the first through the fourth low refraction regions 221 to 224, as mentioned in conjunction with FIG. 10. However, the incident light beam may not always be incident onto each low refraction region but onto the first principal surface. In this case, the incident light beam must be incident onto the first principal surface at an angle greater than the critical angle of the planar substrate 20 so that total reflection is made between the first and the second principal surfaces of the planar substrate 20.

Figure 12:
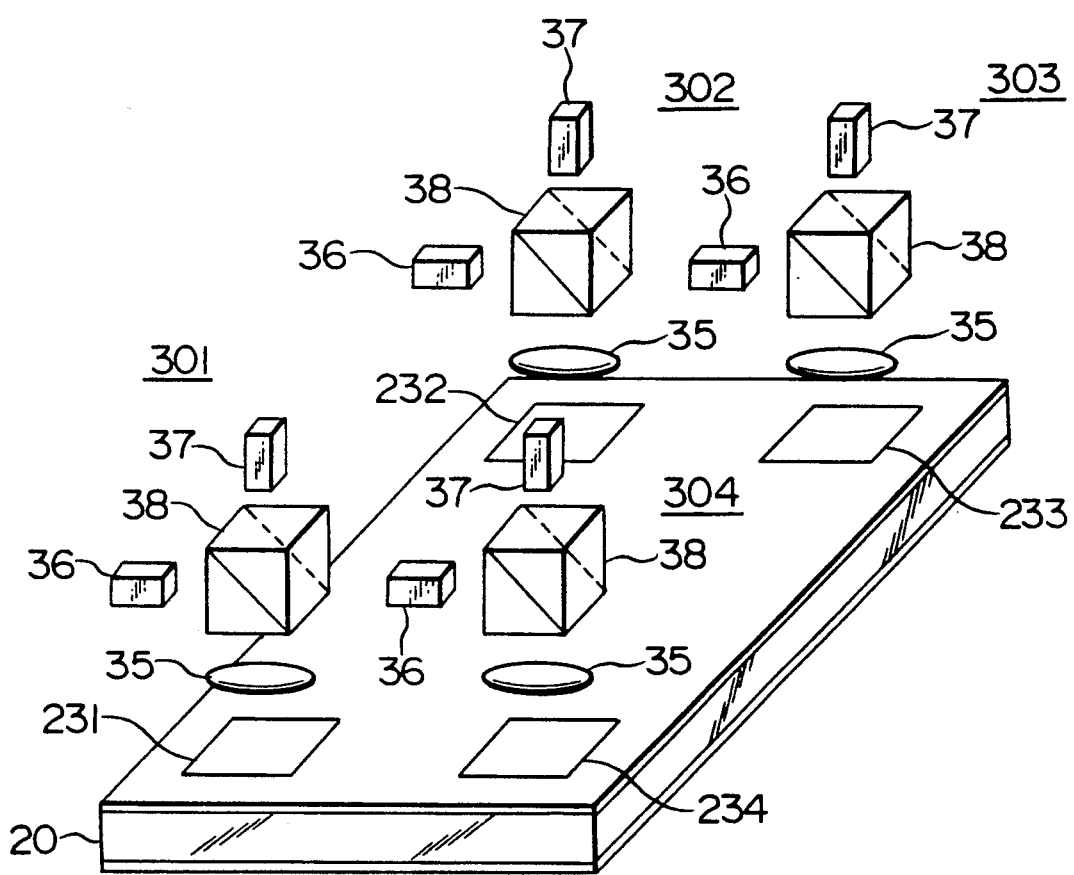
FIG. 12 is a similar view of an optical connection device according to a sixth embodiment of this invention based on the third additional principle illustrated in FIG. 9.

Referring to FIG. 12, an optical connection device according to a sixth embodiment of this invention is based on the third additional principle of this invention and is similar in structure and operation to that illustrated in FIG. 11 except that first through fourth hologram regions 231 to 234 are formed instead of the first through the fourth low refraction regions 221 to 224. Each of the first through the fourth hologram regions 221 to 224 serves to diffract the internal light beam and to emit the same as the output light beam in the manner illustrated with reference to FIG. 9.

Like in FIG. 11, the incident light beam may be incident through each hologram region into the planar substrate 20 or may be incident into the planar substrate 20 through the first principal surface at an angle greater than the critical angle of the planar substrate 20. At any rate, the output light beam generated by each light source is distributed to the remaining optical nodes in a manner similar to that illustrated in FIGS. 10 and 11.

While this invention has thus far been described in conjunction with several embodiments thereof, it will readily be possible for those skilled in the art to put this invention into practice in various other manners. For example, the planar substrate may be formed by plastics or the like.

What is claimed is:

1. An optical connection device for use in responding to an input light beam to produce a plurality of output light beams therethrough, said connection device comprising:
a planar optical transmission medium which has a primary refraction coefficient and which has first and second principal surfaces opposite to each other and a side surface contiguous to said first and said second principal surfaces;
a plurality of optical island regions which are formed from said first principal surface towards second principal surface with spacings left among said optical island regions on said first principal surface and each of which has a secondary refraction coefficient different from said primary refraction coefficient; and
optical source means for emitting said input light beam onto said side surface of the planar optical transmission medium to derive said output light beams from said optical island regions.

2. An optical connection device as claimed in claim 1, wherein said optical island regions are provided by recessed portions which are formed from said first principal surfaces towards said second principal surface with preselected curvature.

3. An optical connection device as claimed in claim 1, wherein said optical island regions are provided by lens portions which are formed from said first principal surface towards said second surface and which have said secondary refraction coefficient smaller than said primary refraction coefficient.

4. An optical connection device as claimed in claim 1, wherein said optical island regions are provided by hologram regions each of which is formed by the secondary refraction coefficient smaller than said primary refraction coefficient.

5. An optical connection device for use in transmitting a plurality of optical transmission beams through an optical coupler among a plurality of optical nodes, said optical coupler comprising:
a planar optical transmission medium which has a primary refraction coefficient and which has first and second principal surfaces opposite to each other and a side surface contiguous to said first and said second principal surfaces; and
a plurality of optical island region which are formed from said first principal surface towards said second principal surface and each of which has a secondary refraction coefficient different from said primary refraction coefficient;
each of said optical nodes being adjacent to each of each optical island regions and comprising:
a light source for generating an input light beam;
an optical receiver for receiving an output optical beam from each of said optical island regions; and
an optical system adjacent to each of said optical island regions and optically coupled to said light source and said optical receiver for transmitting said input light beam from said light source to each of said optical island regions as a selected one of said optical transmission beams on one hand and, otherwise, transmitting said optical transmission beams from each of said optical island regions as said output light beam to said optical receiver on the other hand.

6. An optical connection device as claimed in claim 5, wherein said optical island regions are provided by recessed portions which are formed from said first principal surface towards said second principal surface with preselected curvature.

7. An optical connection device as claimed in claim 5, wherein said optical island regions are provided by lens portions which are formed from said first principal surface towards said second surface and which have said secondary refraction coefficients smaller than said primary refraction coefficient.

8. An optical connection device as claimed in claim 5, wherein said optical island regions are provided by hologram regions each of which is formed by the secondary refraction coefficient smaller than said primary refraction coefficient.

9. An optical connection device as claimed in claim 5, wherein said first and said second principal surfaces are coated with first and second reflection films, respectively, with said optical island regions uncovered with said first reflection film.

10. An optical coupler for use in responding to an incident light beam to produce a plurality of output light beams, said optical coupler comprising:
   a planar optical transmission medium which has a primary refraction coefficient and which has first and second principal surfaces opposite to each other and a side surface; and
   a plurality of optical island regions which are formed along said first principal surface and each of which has a secondary refraction coefficient different from said primary refraction coefficient;
   wherein said first and said second principal surfaces are coated with first and second reflection films, respectively, with said optical island regions uncovered with said first reflection film.

11. An optical coupler for use in responding to an incident light beam to produce a plurality of output light beams, said optical coupler comprising:
   a planar optical transmission medium which has a primary refraction coefficient and which has first and second principal surfaces opposite to each other and a side surface; and
   a plurality of optical island regions which are formed along said first principal surface and each of which has a secondary refraction coefficient different from said primary refraction coefficient;
   wherein said optical island regions are provided by recessed portions formed from said first principal surface towards said second principal surface to define boundaries which have said secondary refraction coefficient between said first principal surface and said recessed portions.

12. An optical coupler for use in responding to an incident light beam to produce a plurality of output light beams, said optical coupler comprising:
   a planar optical transmission medium which has a primary refraction coefficient and which has first and second principal surfaces opposite to each other and a side surface; and
   a plurality of optical island regions which are formed along said first principal surface and each of which has a secondary refraction coefficient different from said primary refraction coefficient;
   wherein said optical island regions are provided by lens portions each of which has said secondary refraction coefficient smaller than said primary refraction coefficient.

13. An optical coupler for use in responding to an incident light beam to produce a plurality of output light beams, said optical coupler comprising:
   a planar optical transmission medium which has a primary refraction coefficient and which has first and second principal surfaces opposite to each other and a side surface; and
   a plurality of optical island regions which are formed along said first principal surface and each of which has a secondary refraction coefficient different from said primary refraction coefficient;
   wherein said optical island regions are provided by hologram regions each of which has said secondary refraction coefficient different from said primary refraction coefficient to diffract said internal light beam into each of said output light beams.

* * * * *

UNITED STATES PATENT AND TRADEMARK OFFICE
CERTIFICATE OF CORRECTION

PATENT NO. : 5,235,661

DATED : August 10, 1993

INVENTOR(S) : Shigeru KAWAI

It is certified that error appears in the above-identified patent and that said Letters Patent is hereby corrected as shown below:

Column 8, line 50, after "optical" insert --lens system 35, the beam splitter 38, and the optical--.

Signed and Sealed this

Twenty-third Day of August, 1994

Attest:

BRUCE LEHMAN

*Attesting Officer*      *Commissioner of Patents and Trademarks*